(12) United States Patent
Wu et al.

(10) Patent No.: US 8,310,826 B2
(45) Date of Patent: Nov. 13, 2012

(54) PROTECTIVE COVER AND PORTABLE ELECTRONIC DEVICE USING THE SAME

(75) Inventors: Kun-Tsan Wu, Shindian (TW); Li-Wen Tien, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 190 days.

(21) Appl. No.: 12/905,216

(22) Filed: Oct. 15, 2010

(65) Prior Publication Data

US 2011/0317339 A1    Dec. 29, 2011

(30) Foreign Application Priority Data

Jun. 29, 2010    (CN) ..................... 2010 2 0239898 U

(51) Int. Cl.
*G06F 1/16*    (2006.01)
(52) U.S. Cl. ........... 361/679.3; 361/679.09; 361/679.55; 361/679.56; 206/701; 206/722; 206/320; 220/23.91
(58) Field of Classification Search ................. 361/679.3
See application file for complete search history.

(56) References Cited

U.S. PATENT DOCUMENTS

| | | | | |
|---|---|---|---|---|
| 5,128,829 A * | 7/1992 | Loew | ......................... | 361/679.3 |
| 5,632,373 A * | 5/1997 | Kumar et al. | ................. | 206/305 |
| 5,725,098 A * | 3/1998 | Seifert et al. | ................... | 206/472 |
| 5,847,698 A * | 12/1998 | Reavey et al. | ................. | 345/173 |
| 6,515,852 B2 * | 2/2003 | Huang et al. | ............. | 361/679.08 |
| 6,561,349 B2 * | 5/2003 | Lee | ................. | 206/320 |
| 6,614,649 B1 * | 9/2003 | Wang | ........................ | 361/679.11 |
| 6,785,126 B2 * | 8/2004 | Hazzard et al. | ........... | 361/679.09 |
| 6,976,799 B2 * | 12/2005 | Kim et al. | ...................... | 400/472 |
| 6,999,008 B2 * | 2/2006 | Wang et al. | ...................... | 341/22 |
| D553,352 S * | 10/2007 | Allen et al. | ..................... | D3/218 |
| 7,540,675 B2 * | 6/2009 | Liu | ................................ | 400/472 |
| 2002/0179470 A1 * | 12/2002 | Lee | ............................... | 206/320 |
| 2003/0197745 A1 * | 10/2003 | Daly | ............................. | 345/905 |
| 2004/0097256 A1 * | 5/2004 | Kujawski | ................... | 455/550.1 |
| 2006/0176660 A1 * | 8/2006 | Amiri | ........................... | 361/683 |
| 2011/0075339 A1 * | 3/2011 | Lam | ......................... | 361/679.09 |

* cited by examiner

*Primary Examiner* — Anthony Q Edwards
(74) *Attorney, Agent, or Firm* — Altis Law Group, Inc.

(57) ABSTRACT

A protective cover used to install an electronic unit and a peripheral keyboard, includes a base, a first latching structure and a second latching structure, the base includes a first main section, a second main section and a bendable connecting section connecting the first main section to the second main section; The first latching structure is arranged on the periphery of the first main section; the second latching structure is arranged on the periphery of the second main section. The electronic unit is received in the first main section and secured by the first latching structure, the keyboard is received in the second main section and secured by the second latching structure. The electronic unit and the keyboard can be overlaid by bending of the connecting section. The disclosure also discloses a portable electronic device used the protective cover.

17 Claims, 2 Drawing Sheets

PROTECTIVE COVER AND PORTABLE ELECTRONIC DEVICE USING THE SAME

BACKGROUND

1. Technical Field

The present disclosure relates to a protective cover and a portable electronic device using the same.

2. Description of Related Art

With development of communication technology, portable electronic devices such as mobile phones and hand held computers become more and more compact. In some circumstance users may want to use a peripheral keyboard with their compact device because on-board keyboards may be small or limited in function. However, it can be inconvenient to carry the extra keyboard along with the compact device.

Therefore, there is room for improvement within the art.

BRIEF DESCRIPTION OF THE DRAWINGS

Many aspects of the present protective cover and portable electronic device using the same can be better understood with reference to the following drawings. The components in the various drawings are not necessarily drawn to scale, the emphasis instead being placed upon clearly illustrating the principles of the present disclosure. Moreover, in the drawings, like reference numerals designate corresponding parts throughout the diagrams.

DETAILED DESCRIPTION

Figure 1:
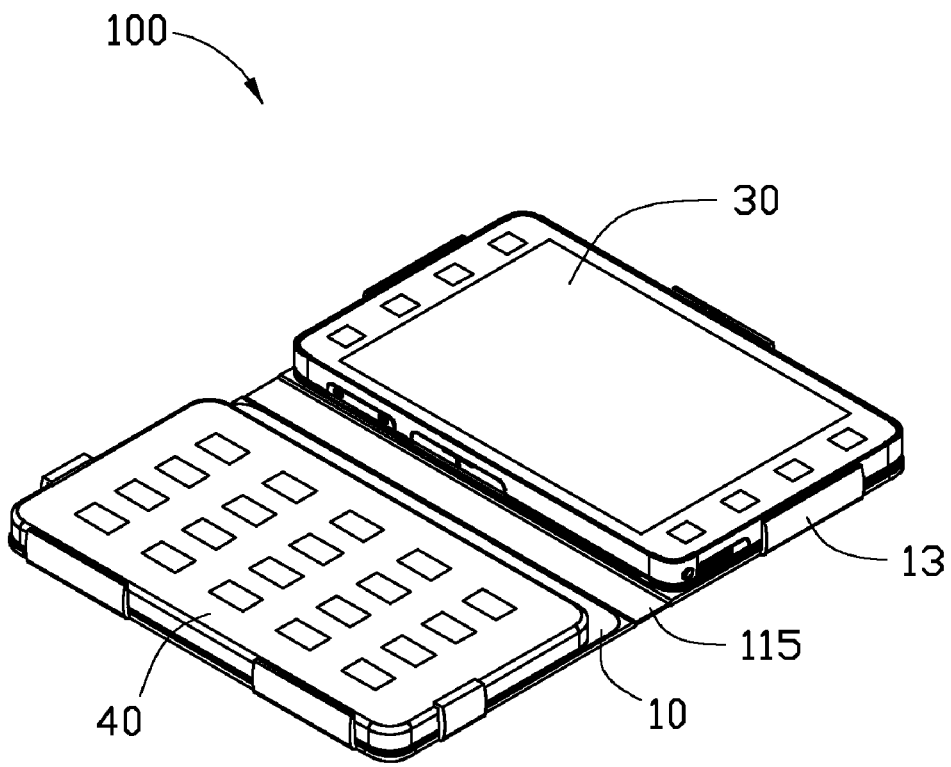
FIG. 1 is an assembled schematic view of a portable electronic device to the exemplary embodiment.

FIG. 1 shows a portable electronic device 100 according to an exemplary embodiment including a protective cover 10, an electronic unit 30 and a peripheral keyboard 40. The protective cover 10 receives the electronic unit 30 and the keyboard 40, the keyboard 40 can be electronically connected to the electronic unit 30 by wires (not shown).

Figure 2:
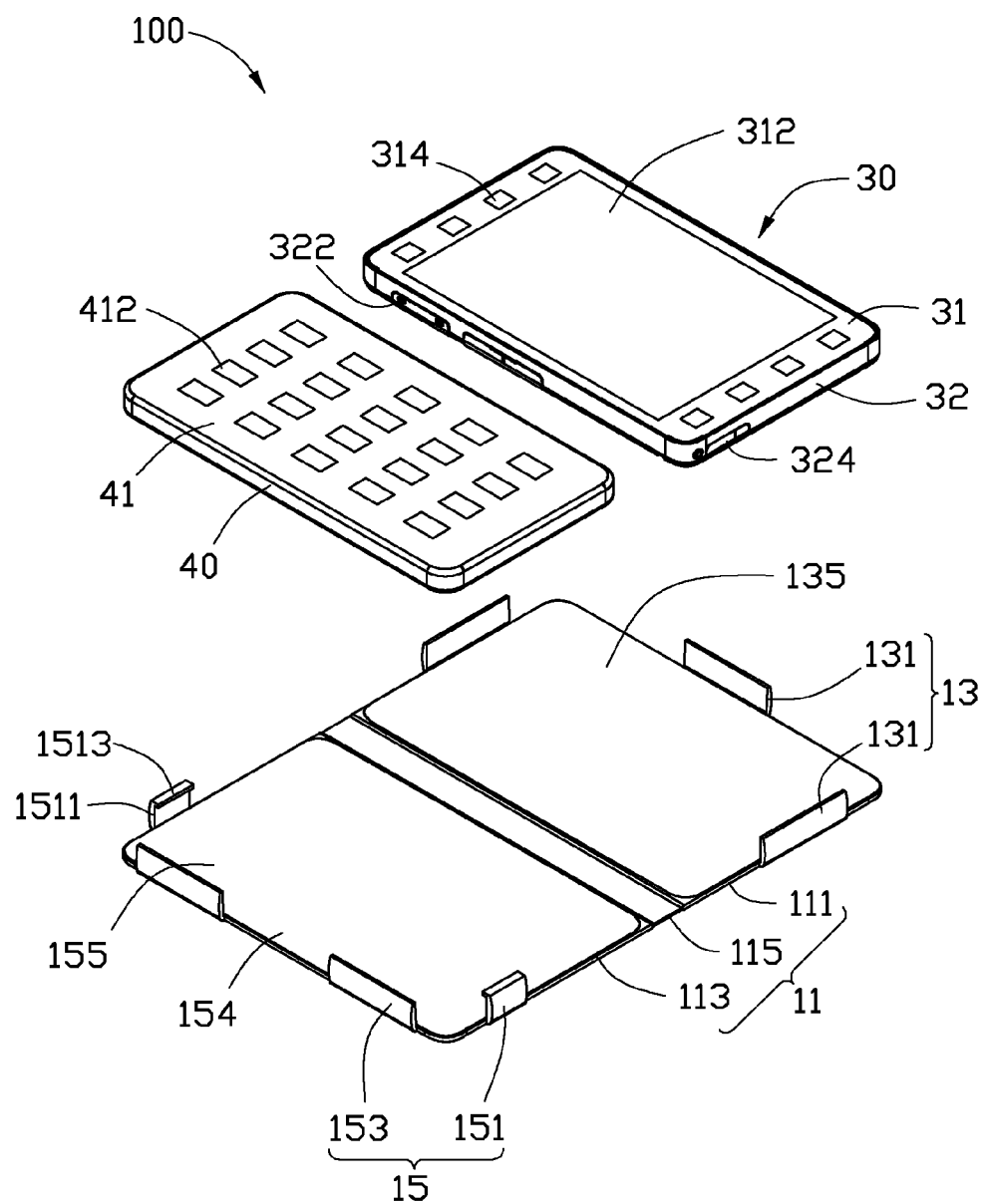
FIG. 2 is an exploded schematic view of the portable electronic device shown in FIG. 1.

Referring to FIG. 2, the protective cover 10 includes a thin flat rectangular base 11, a first latching structure 13 and a second latching structure 15. The base 11 includes a first main section 111, a second main section 113, and a bendable connecting section 115 connecting the first main section 111 to the second main section 113. The first main section 111 and the second main section 113 are rectangular and have substantially the same shape and size, and both can be made of plastic. The connecting section 115 can be made of resilient material, such as rubber. The connecting section 115 can be bent or folded when the first main section 111 is moved from being flush with the second main section 113 to overlying the second main section 113.

The first latching structure 13 is arranged on the periphery of the first main section 111, and includes a plurality of first stopping walls 131. In the embodiment, there are three first stopping walls 131. One of the first stopping walls 131 is positioned at the middle of one end wall of the first main section 111, opposite to the connecting section 115. The other two first stopping walls 131 are oppositely positioned at the two sidewalls of the first main section 111. The three first stopping walls 131 and the first main section 111 together enclose a first receiving space 135. The top of each first stopping wall 131 is slanted toward the inside of the first receiving space 135 to secure the electronic unit 30 in the receiving space 135 of the protective cover 10.

The second latching structure 15 is arranged on the periphery of the second main section 113, and includes a plurality of latching flanges 151 and a plurality of second stopping walls 153. In the exemplary embodiment, there are two latching flanges 151 and two second stopping walls 153. The two latching flanges 151 are oppositely positioned at two sidewalls of the second main section 113. Each latching flange 151 includes a main portion 1511 perpendicularly protruding from the second main section 113, and a hook portion 1513 bending toward to the second main section 113. The two second-stopping walls 153 are positioned at one end wall of the second main section 113, opposite to the connecting section 115. A space 154 is defined between the two second-stopping walls 153 to receive the first stopping wall 131. The two latching flanges 151, the two second stopping walls 153, and the second main section 113 cooperatively enclose a second receiving space 155 for receiving the keyboard 40 therein. The latching flanges 151 and the second stopping walls 153 secure the keyboard 40 in the protective cover 10. It is understood that, the two main sections 113, 115 can have the same or different latching structures, so long as the two latching structures will not interfere with each other when the first main section 111 is overlaid with the second main section 113.

The electronic unit 30 can be a mobile phone with a top wall 31 and peripheral wall 33. The top wall 31 includes a display 312 and function keys 314. The peripheral wall 32 includes interfaces 322 to connect with external components such as the keyboard 40, and buttons 324. The keyboard 40 has a key surface 41 having a plurality of keys 412 arranged thereon.

To assemble the electronic device 100, the electronic unit 30 is received in the first receiving space 135. The first stopping walls 131 clasp the electronic unit 30. The keyboard 40 is received in the second receiving space 155, with the keyboard 40 being secured by the latching flanges 151 and the second stopping walls 153. The electronic unit 30 electronically connects to the keyboard 40. When using the electronic device 100, the electronic device 100 is unfolded, the first main section 111 is flush with the second main portion 113. In this case, the display 312 of the electronic device 30 and the keys 412 of the keyboard 40 are exposed to the outside. To carry the electronic device 100, the electronic device 100 is folded, the connecting section 115 is bent, the first main section 111 is overlaid on the second main section 113, and the display 312 of the electronic unit 30 abuts against the key surface 41 of the keyboard 40.

It is to be understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A protective cover, used to install an electronic unit and a peripheral keyboard for carrying, comprising:
    a base including a first main section, a second main section and a bendable connecting section connecting the first main section to the second main section;
    a first latching structure arranged on the periphery of the first main section, the first latching structure comprising three first stopping walls, one of the first stopping walls positioning at the middle of one end wall of the first main section, opposite to the connecting section, the other two first stopping walls oppositely positioning at the two sidewalls of the first main section;

a second latching structure arranged on the periphery of the second main section;

wherein the electronic unit is received in the first main section and secured by the first latching structure, the keyboard is received in the second main section and secured by the second latching structure, the electronic unit and the keyboard can be overlaid by bending of the connecting section.

2. The protective cover as claimed in claim 1, wherein the main section and the second main section are substantially the same shape and size.

3. The protective cover as claimed in claim 1, wherein the connecting section is made of resilient material.

4. The protective cover as claimed in claim 1, wherein the first stopping walls with the first main section enclose a first receiving space to receive the electronic unit.

5. The protective cover as claimed in claim 4, wherein the second latching structure includes a plurality of latching flanges and a plurality of second stopping walls, the latching flanges, the second stopping walls and the second main section enclose a second receiving space to receives the keyboard.

6. The protective cover as claimed in claim 5, wherein the second latching structure includes two latching flanges and two second stopping walls, the two latching flanges are oppositely positioned at two sidewalls of the second main section, the two second stopping walls are positioned at one end wall of the second main section, opposite to the connecting section.

7. The protective cover as claimed in claim 6, wherein the latching flange includes a main portion perpendicularly protruding from the second main section, and a hook portion bending toward to the second main section, at the top of the main portion.

8. The protective cover as claimed in claim 6, wherein a space is defined between the two second stopping walls to correspondingly receive the first stopping wall.

9. The protective cover as claimed in claim 1, wherein the first main section and the second main section both can be made of plastic materials.

10. A portable electronic device, comprising:
a protective cover comprising a first main section, a second main section and a bendable connecting section connecting the first main section to the second main section;
an electronic unit secured in the first main section; and
a peripheral keyboard secured in the second main section;
wherein
the first main section can be flush with the second main section and the connecting section, and then the first main section is spaced from the second main section by the connecting section; the electronic unit and the keyboard can be oppositely overlaid by folding the protective cover along the connecting section; the protective cover further comprises a first latching structure arranged on the periphery of the first main section and a second latching structure arranged on the periphery of the second main section, wherein the second latching structure includes a plurality of latching flanges and a plurality of second stopping walls, the latching flanges, the second stopping walls and the second main section enclose a second receiving space to receive the keyboard.

11. The portable electronic device as claimed in claim 10, wherein the second latching structure includes two latching flanges and two second stopping walls, the two latching flanges are oppositely positioned at two sidewalls of the second main section, the two second stopping walls are positioned at one end wall of the second main section, opposite to the connecting section.

12. The portable electronic device as claimed in claim 11, wherein the latching flange includes a main portion perpendicularly protruding from the second main section, and a hook portion bending toward to the second main section, at the top of the main portion.

13. The portable electronic device as claimed in claim 11, wherein a space is defined between the two second stopping walls to correspondingly receive the first stopping wall.

14. The portable electronic device as claimed in claim 10, wherein the first latching structure includes a plurality of first stopping wall, the first stopping walls with the first main section enclose a first receiving space to receive the electronic unit.

15. The portable electronic device as claimed in claim 14, wherein the first latching structure includes three first stopping walls, one of the first stopping walls is positioned at the middle of one end wall of the first main section, opposite to the connecting section, the other two first stopping walls are oppositely positioned at the two sidewalls of the first main section.

16. The portable electronic device as claimed in claim 10, wherein the electronic unit has a top wall and a peripheral wall, the top wall includes a display and function keys, the peripheral wall defines interfaces.

17. The portable electronic device as claimed in claim 10, wherein the keyboard has a key surface having a plurality of keys arranged thereon.

* * * * *